(12) United States Patent
Lau et al.

(10) Patent No.: US 12,286,121 B2
(45) Date of Patent: Apr. 29, 2025

(54) AUTOMATIC SNOW CHAIN DEPLOYMENT

(71) Applicant: TUSIMPLE, INC., San Diego, CA (US)

(72) Inventors: Jason Robert Lau, San Diego, CA (US); Robert Patrick Brown, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 1128 days.

(21) Appl. No.: 17/000,030

(22) Filed: Aug. 21, 2020

(65) Prior Publication Data
US 2022/0055405 A1    Feb. 24, 2022

(51) Int. Cl.
| | |
|---|---|
| *B60W 40/00* | (2006.01) |
| *B60B 39/00* | (2006.01) |
| *B60W 40/06* | (2012.01) |
| *G06F 16/00* | (2019.01) |
| *G06F 16/29* | (2019.01) |
| *G06V 20/58* | (2022.01) |

(52) U.S. Cl.
CPC ........... *B60W 40/06* (2013.01); *B60B 39/003* (2013.01); *G06F 16/29* (2019.01); *G06V 20/582* (2022.01); *B60W 2555/20* (2020.02)

(58) Field of Classification Search
CPC ... B60W 40/06; B60W 2555/20; G06F 16/29; G06V 20/582; B60B 39/003
USPC .......................................................... 701/82
See application file for complete search history.

(56) References Cited

U.S. PATENT DOCUMENTS

| | | | |
|---|---|---|---|
| 9,834,048 B1 | 12/2017 | Price | |
| 2018/0376306 A1 | 12/2018 | Ramalho de Oliveira | |
| 2019/0016341 A1* | 1/2019 | Nelson | G08G 1/0133 |
| 2019/0095725 A1* | 3/2019 | Kalghatgi | G06V 20/59 |

(Continued)

FOREIGN PATENT DOCUMENTS

| | | |
|---|---|---|
| DE | 102015007036 A1 | 12/2016 |
| DE | 102016007734 A1 | 2/2017 |
| EP | 2402737 A1 | 1/2012 |

(Continued)

OTHER PUBLICATIONS

MS Foster, "Insta-Chain—Automatic Ice Chain," 2016, MS Foster Website, Blog, whole document. (Year: 2016).*

(Continued)

*Primary Examiner* — Tiffany P Young
(74) *Attorney, Agent, or Firm* — Perkins Coie LLP (57) ABSTRACT

Techniques are described for determining whether snow chains are permitted to be used and to deploy snow chains based on traffic signs, weather conditions, and/or road conditions. An example method of autonomous driving operation includes performing a first determination, by a computer located in an autonomous vehicle, whether a use of snow chains is permitted based at least on a location where the autonomous vehicle is operating, performing a second determination that snow chains are required for driving the autonomous vehicle on a road, and sending, in response to the first determination indicating that the use of snow chains is permitted and in response to the second determination, instruction to snow chain devices located on the autonomous vehicle, where the instruction triggers the snow chain devices to deploy snow chains on tires of the autonomous vehicle.

18 Claims, 3 Drawing Sheets

(56) References Cited

U.S. PATENT DOCUMENTS

2020/0307578 A1\* 10/2020 Magolan ............... B60W 20/00

FOREIGN PATENT DOCUMENTS

| EP | 2976761 | B1 | 1/2016 |
| EP | 3686073 | A1 | 7/2020 |

OTHER PUBLICATIONS

European Patent Office, Extended European Search Report for EP 21187885, Mailing Date: Jan. 19, 2022, 9 pages with English translation.
"Insta-Chain: The Automatic Icechain", http://www.instachain.com/.
European Patent Office, Communication pursuant to Article 94(3) EPC for Appl. No. 21187885.5, mailed on Jun. 6, 2024, 5 pages.

\* cited by examiner

AUTOMATIC SNOW CHAIN DEPLOYMENT

TECHNICAL FIELD

This document relates to systems, apparatus, and methods to determine when snow chains are to be deployed in an autonomous vehicle.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself. In yet some other cases, an autonomous vehicle may be driven without a driver from a starting location to a destination.

SUMMARY

When an autonomous vehicle is driven, the autonomous vehicle's driving related operations (e.g., speed, steering, braking) may be dependent on road conditions that may depend on weather conditions. This patent document describes systems, apparatus, and methods to determine whether or when automatic snow chains should be deployed in an autonomous vehicle operating on a road.

In an example embodiment, a method of autonomous driving operation includes performing a first determination, by a computer located in an autonomous vehicle, whether a use of snow chains is permitted based at least on a location where the autonomous vehicle is operating; performing a second determination that snow chains are required for driving the autonomous vehicle on a road; and sending, in response to the first determination indicating that the use of snow chains is permitted and in response to the second determination, instruction to snow chain devices located on the autonomous vehicle, where the instruction triggers the snow chain devices to deploy snow chains on tires of the autonomous vehicle.

In some embodiments, the first determination is performed by selecting a snow chain rule associated with an area that includes the location where the autonomous vehicle is operating, and the snow chain rule is selected from a pre-determined list of snow chain rules that indicate whether or when snow chains are permitted in a plurality of areas. In some embodiments, the snow chain rule indicates a range of dates when the use of the snow chains is permitted, and the first determination includes determining that the use of the snow chain is permitted based on determining that a date when the autonomous vehicle is operating is within the range of dates when the use of snow chains is permitted. In some embodiments, the snow chain rule indicates a range of dates when the use of the snow chains is not permitted, the first determination includes determining that the use of the snow chains is not permitted based on determining that a date when the autonomous vehicle is operating is within the range of dates when the use of snow chains is not permitted, and a deployment of the snow chain devices is disabled in response to the determining that the use of the snow chains is not permitted.

In some embodiments, the performing the second determination is based on a traffic sign located on the road, where the traffic sign includes words that indicate that snow chains are required. In some embodiments, the method further comprises receiving, from a camera located on the autonomous vehicle, an image of an area towards which the autonomous vehicle is operating, where the image comprises the traffic sign; and determining that the traffic sign in the image indicates that snow chains are required by performing optical character recognition on a portion of the image associated with the traffic sign.

In some embodiments, the performing the second determination is based on a traffic sign located on the road, and where the traffic sign includes a picture that indicates that snow chains are required. In some embodiments, the performing the second determination is based on a message received from a remote computer in a command center located outside the autonomous vehicle, and where the message indicate that snow chains are required for driving the autonomous vehicle on the road.

In some embodiments, the performing the second determination is based on road conditions determined by receiving, from a temperature sensor located on the autonomous vehicle, a measurement of a temperature of an environment in which the autonomous vehicle is operating; receiving, from a camera located on the autonomous vehicle, an image of an area towards which the autonomous vehicle is driven; and where the second determination that the snow chains are required is performed in response to: a third determination that the temperature is less than a pre-determined value, and a fourth determination that a presence of a fog in the image. In some embodiments, the temperature of the environment is the temperature of the road.

In some embodiments, the performing the second determination is based on road conditions determined by receiving information that indicates a wind speed of a region that includes the location where the autonomous vehicle is operating; receiving, from a temperature sensor located on the autonomous vehicle, a measurement of a temperature of an environment in which the autonomous vehicle is operating; receiving, from a camera located on the autonomous vehicle, an image of an area towards which the autonomous vehicle is driven; and where the second determination that the snow chains are required is performed in response to: a third determination that the wind speed is less than a first pre-determined value, a fourth determination that the temperature is less than a second pre-determined value, and a fifth determination that the image comprises a clear night sky.

In some embodiments, the performing the second determination is based on weather conditions determined by determining a driving path along which the autonomous vehicle is operating to reach a destination; receiving the weather conditions along the driving path; determining, based on the weather conditions, that one or more regions along the driving path require snow chains; and where the sending the instruction to snow chain devices is performed when the autonomous vehicle is determined to arrive at the one or more regions.

In some embodiments, the method further comprises sending a second instruction to the snow chain devices that causes the snow chain devices to retract the snow chains upon determining that the autonomous vehicle is outside of the one or more regions. In some embodiments, the performing the second determination is based on a reception of information by the computer by: receiving, from a transmitter located on the road, information that indicates that snow chains are required; and where the sending the instruction to snow chain devices is performed in response to the receiving the information. In some embodiments, the performing the second determination is based on: receiving, from a wheel speed sensor located in the autonomous vehicle, a wheel speed of a wheel of the autonomous vehicle; where the sending the instruction to snow chain devices is performed in response to determining that a difference between a speed of the autonomous vehicle and the wheel speed of the wheel is greater than a pre-determined value.

In some embodiments, the pre-determined value is a percentage of the speed of the autonomous vehicle. In some embodiments, the snow chain devices are deployed by: causing the snow chain devices to move down towards the tires of the autonomous vehicle, where the snow chains are caused to spin between the tires of the autonomous vehicle and the road. In some embodiments, the location of the autonomous vehicle is provided by a global positioning system (GPS) device located on the autonomous vehicle.

In yet another exemplary aspect, the above-described method is embodied in a non-transitory computer readable storage medium comprising code that when executed by a processor, causes the processor to perform the methods described in this patent document.

In yet another exemplary embodiment, a device that is configured or operable to perform the above-described methods is disclosed. In yet another exemplary embodiment, a system that includes a computer with a processor configured or operable to perform the above-described methods is disclosed.

The above and other aspects and their implementations are described in greater detail in the drawings, the descriptions, and the claims.

DETAILED DESCRIPTION

Developments in autonomous driving technology have led to a development of a semi-trailer truck (e.g., a tractor-trailer truck, a semi-tractor-trailer truck, a class-8 truck) that can be autonomously driven to deliver goods to a destination. When a semi-trailer truck is driven to its destination, the semi-trailer truck can experience different types of environments that can affect its driving related operations. In an example scenario, an in-vehicle control computer located in a semi-trailer truck can determine that the semi-trailer truck is or will be driven through an area where snow chains are required or should be used. In this example scenario, the in-vehicle control computer can, upon determining that the use of snow chains is permitted by local or state law where the semi-trailer truck is located, send an instruction to a snow chain device installed in the semi-trailer truck to deploy the snow chain device without having a human install the snow chains. Thus, the semi-trailer truck can safely operate in areas where show chains are required or should be used.

The in-vehicle control computer may store a database of traffic laws that can include snow chain rules that indicate when a state or local law permits and/or does not permit usage of snow chains. For example, a snow chain rule for the State of Alaska can indicate that snow chains are not allowed to be deployed from April 15 through September 30 when the semi-trailer truck is south of 60-degrees north latitude. In some embodiments, the in-vehicle control computer can determine when to deploy snow chains based on posted traffic signs. In some embodiments, the in-vehicle control computer can determine when to deploy snow chains based on a determination of weather and/or road condition. In some embodiments, the in-vehicle control computer first determines that a semi-trailer truck is operating in a location or state where snow chains are permitted, and then determines to deploy snow chains based on posted traffic signs, weather conditions, and/or road conditions.

Section I of this patent document provides an overview of the devices/systems located on or in an autonomous vehicle, such as an autonomous semi-trailer truck. Section II of this patent document describes techniques employed by the in-vehicle control computer to determine whether snow chains are permitted to be used or based on snow chain rules that may be stored in the in-vehicle control computer. Section III of this patent document describes techniques employed by the in-vehicle control computer to determine when snow chains are to be deployed based on posted traffic signs. Section IV of this patent document describes techniques employed by the in-vehicle control computer to determine weather and/or road conditions and determine whether snow chains should be deployed. In some embodiments, the weather and/or road condition determination may be made using multiple sensors to minimize false positive condition where inaccurate or incorrect sensor data from one sensor indicates that snow chains should be deployed. The example headings for the various sections below are used to facilitate the understanding of the disclosed subject matter and do not limit the scope of the claimed subject matter in any way. Accordingly, one or more features of one example section can be combined with one or more features of another example section.

I. Autonomous Driving Ecosystem

Figure 1:
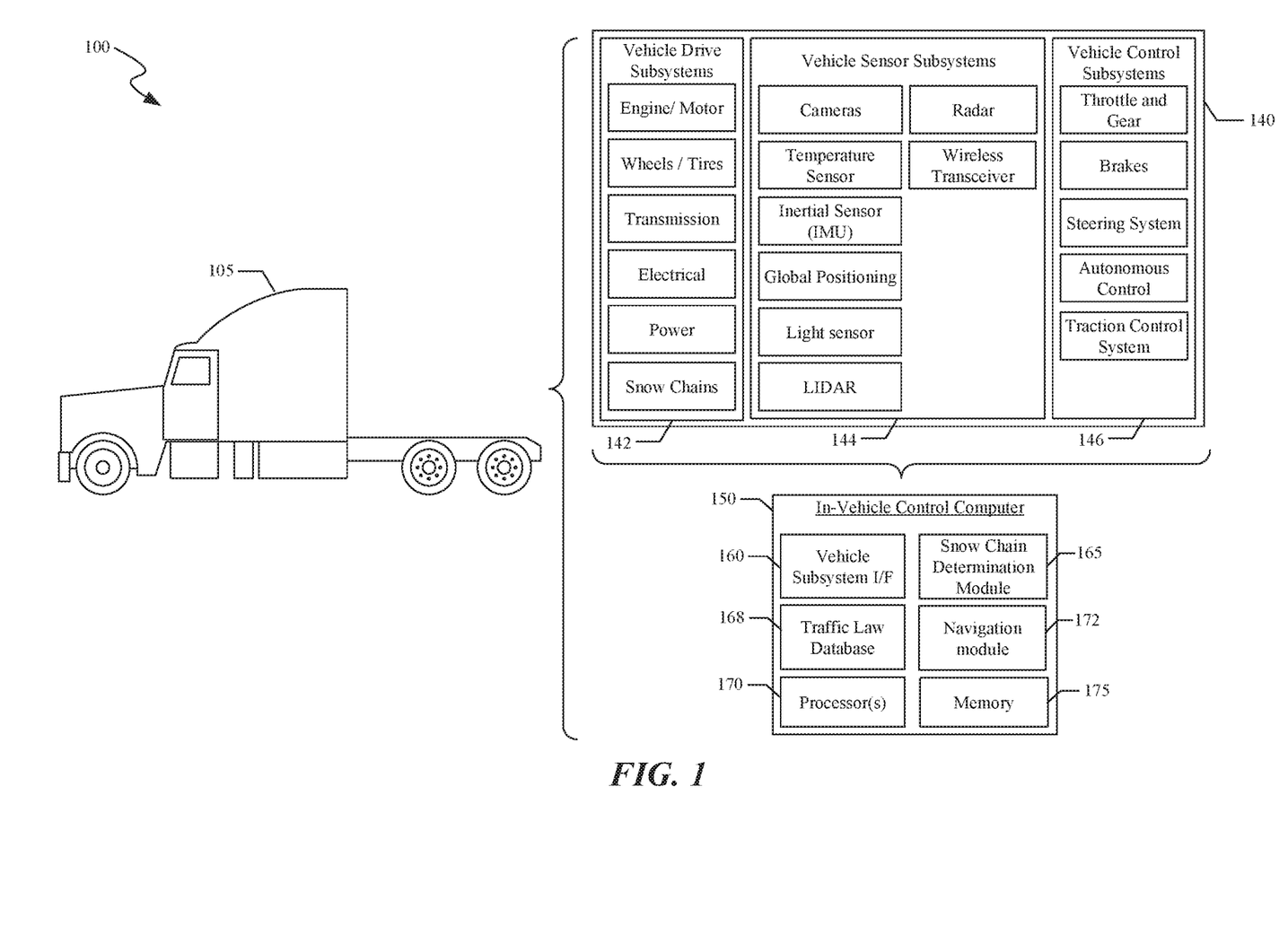
FIG. 1 shows a block diagram of an example vehicle ecosystem in which an in-vehicle control computer located in the vehicle can determine whether and/or when to deploy snow chains.

FIG. 1 shows a block diagram of an example vehicle ecosystem 100 in which an in-vehicle control computer 150 located in the vehicle 105 can determine whether and/or when to deploy snow chains. As shown in FIG. 1, the vehicle 105 may be a semi-trailer truck. The vehicle ecosystem 100 includes several systems and components that can generate and/or deliver one or more sources of information/data and related services to the in-vehicle control computer 150 that may be located in a vehicle 105. The in-vehicle control computer 150 can be in data communication with a plurality of vehicle subsystems 140, all of which can be resident in the vehicle 105. A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The vehicle 105 may include various vehicle subsystems that support of the operation of vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices can be removed without affecting the snow chain deployment related features described in this patent document. The vehicle drive subsystem 142 may include components operable to provide powered motion for the vehicle 105. In an example embodiment, the vehicle drive subsystem 142 may include an engine or motor, wheels/tires, a transmission, an electrical subsystem, a power source, and snow chains.

Snow chain devices may be previously installed in the vehicle 105. In one example implementation, snow chain devices provided by Insta-Chain can be installed on one or more axles of the vehicle 105 and may be used with two or more tires of the vehicle 105. When a snow chain determination module 165 sends instructions to the Insta-Chain snow chain device to deploy, the pneumatic air cylinders of each Insta-Chain snow chain device moves a wheel with a set of chains of the Insta-Chain snow chain device down against the inside of the vehicle 105's tire at approximately the center point of the tire. The vehicle 105's tire spins, which turns the wheel of the Insta-Chain snow chain device which in turn spins the set of chains. When a vehicle 105 is driven, the spinning chains of each Insta-Chain snow chain device is caught between the road and the tire, which may provide the vehicle 105 with better traction on the road. Though snow chain deployment devices are discussed with respect to Insta-Chain devices, any suitable type of automatic ice-chain or snow chain deployment system or device may be used.

The vehicle sensor subsystem 144 may include a number of sensors configured to sense information about an environment in which the vehicle 105 is operating or a condition of the vehicle 105. As further explained in this patent document, the snow chain determination module 165 in the in-vehicle control computer 150 can determine whether and/or when snow chains should be deployed. The vehicle sensor subsystem 144 may include one or more cameras or image capture devices, one or more temperature sensors, an inertial measurement unit (IMU), a Global Positioning System (GPS) transceiver, a laser range finder/LiDAR unit, a Radar unit, and/or a wireless transceiver (e.g., a cellular communication transceiver). The vehicle sensor subsystem 144 may also include sensors configured to monitor internal systems of the vehicle 105 (e.g., an 02 monitor, a fuel gauge, an engine oil temperature, etc.). In some embodiments, the vehicle sensor subsystem 144 may include sensors in addition to the sensors shown in FIG. 1.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The Radar unit may represent a system that utilizes radio signals to sense objects within the environment in which the vehicle 105 is operating. In some embodiments, in addition to sensing the objects, the Radar unit may additionally be configured to sense the speed and the heading of the objects proximate to the vehicle 105. The laser range finder or LiDAR unit may be any sensor configured to sense objects in the environment in which the vehicle 105 is located using lasers. The cameras may include one or more cameras configured to capture a plurality of images of the environment of the vehicle 105. The cameras may be still image cameras or motion video cameras.

The vehicle control subsystem 146 may be configured to control operation of the vehicle 105 and its components. Accordingly, the vehicle control subsystem 146 may include various elements such as a throttle and gear, a brake unit, a steering system, and/or an autonomous control unit. The throttle may be configured to control, for instance, the operating speed of the engine and, in turn, control the speed of the vehicle 105. The gear may be configured to control the gear selection of the transmission. The brake unit can include any combination of mechanisms configured to decelerate the vehicle 105. The brake unit can use friction to slow the wheels in a standard manner. The brake unit may include an anti-lock brake system (ABS) that can prevent the brakes from locking up when the brakes are applied. The steering system may represent any combination of mechanisms that may be operable to adjust the heading of vehicle 105 in an autonomous mode or in a driver-controlled mode.

The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the GPS transceiver, the Radar, the LiDAR, the cameras, and/or other vehicle subsystems to determine the driving path or trajectory for the vehicle 105.

The traction control system (TCS) may represent a control system configured to prevent the vehicle 105 from swerving or losing control while on the road. For example, TCS may obtain signals from the IMU and the engine torque value to determine whether it should intervene and send instruction to one or more brakes on the vehicle 105 to mitigate the vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the vehicle 105 in a distributed fashion. In some embodiments, the memory 175 may contain processing instructions (e.g., program logic) executable by the processor 170 to perform various methods and/or functions of the vehicle 105, including those described for the snow chain determination module 165 as explained in this patent document. For instance, the processor 170 executes the operations associated with snow chain determination module 165 for determining whether and/or when snow chain device(s) should be deployed using techniques described in Sections II to IV.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the vehicle 105 based on inputs received from various vehicle subsystems (e.g., the vehicle drive subsystem 142, the vehicle sensor subsystem 144, and the vehicle control subsystem 146).

II. Snow Chain Rules

The snow chain determination module 165 can determine whether show chains can be deployed based at least on a location of the vehicle 105 and based on snow chain rules previously stored in the traffic law database 168 in the in-vehicle control computer 150. The traffic law database 168 can include a previously stored list of snow chain rules that indicate when and/or in what conditions snow chains are permitted or not permitted to be deployed. In an example implementation, the traffic law database 168 can store snow chain rules including those shown in Table 1 below. The snow chain rules stored in the traffic law database 168 can generally indicate when and/or in what conditions snow chains device located on the vehicle 105 are permitted or not permitted to be deployed.

TABLE 1

Snow Chain Deployment Traffic Law

| Location/State | Snow Chain Rules |
| --- | --- |
| Alaska | Snow chains are not permitted from May 1 through September 15 when a vehicle is operating north of 60-degrees north latitude |
| Alaska | Snow chains are not permitted for a vehicle operating on Sterling Highway from May 1 through September 15 |
| California | Snow chain deployment is based on a posted traffic sign that states "chains required" or that shows a picture of snow chains |
| Delaware | Snow chains are permitted to use chains on highways from October 15 through April 15 |
| Iowa | Snow chains are allowed when required for safety during a time of snow, ice, or another condition that might cause slippery highways |
| . . . | . . . |

Table 1 shows that several types of snow chain rules can be stored in the traffic law database 168. Some snow chain rules may be based on a location of the vehicle 105 and/or a date when the vehicle 105 is operating. The snow chain determination module 165 can determine whether the snow chains devices on a vehicle 105 are permitted to be deployed based on a date when the vehicle 105 is operating and/or based on a specific location of the vehicle 105. For example, when the snow chain determination module 165 determines that a vehicle 105 is operating in Alaska based on a location provided by a GPS device in the vehicle 105, the snow determination module 165 can determine whether the snow chain device(s) (e.g., Insta-Chain snow chains or ice chains) are permitted to be deployed based on date when the vehicle 105 is operating and/or based on a specific location of the vehicle 105 in Alaska (e.g., north of 60-degrees north latitude or Sterling Highway). In another example, when the snow chain determination module 165 determines, based on a location of the vehicle 105 received from a GPS device, that the vehicle 105 is operating in Delaware, the snow chain determination module 165 can select the snow chain rule for Delaware from the traffic law database 168. Using Table 1, if the snow chain determination module 165 determines that the vehicle 105 is operating in Delaware between October 15 and April 15, then the snow chain determination module 165 can determine that the snow chain device is permitted to be deployed.

In yet another example, using Table 1, when the snow chain determination module 165 determines that the vehicle 105 is operating in Alaska on Sterling Highway on May 28, the snow chain determination module can determine that the snow chain is not permitted to be deployed. In scenarios where the snow chain determination module 165 determines that the snow chain device is not permitted to be deployed, the snow chain deployment module 165 prevents the snow chain device from being deployed even if a driver indicates to deploy the snow chains (e.g., by pressing a button in the vehicle 105), in some embodiments.

Some snow chain rules may be based on location and posted traffic signs. For example, when the snow chain determination module 165 determines that a vehicle 105 is operating in California based on a location provided by a GPS device in the vehicle 105, the snow determination module 165 can determine that snow chain devices are permitted to be used and the snow determination module 165 can determine to deploy the snow chain devices based on traffic signs as further explained in Section III. Some snow chain rules may be based weather and/or road conditions as well as on location. For example, when the snow chain determination module 165 determines that a vehicle 105 is operating in Iowa based on a location provided by a GPS device in the vehicle 105, the snow determination module 165 can determine that snow chain device(s) are permitted to be used and the snow chain determination module 165 can determine to deploy the now chain devices based on weather and/or road conditions as further explained in Section IV. As mentioned above, in an implementation example, an instruction provided by the snow chain determination module 165 to deploy a snow chain device may include the snow chain device moving a wheel comprising a set of chains down to each of two or more tires of the vehicle 105.

III. Snow Chain Deployment Based on Traffic Signs or Traffic Signals

The snow chain determination module 165 can send instructions to the snow chain devices located on the vehicle 105 to deploy the snow chains based on traffic signs or traffic signals. A traffic sign may include a physical sign that may be located next to the road on which the vehicle 105 is operated. For example, traffic sign may include the words "chains required" or may snow a picture of a tire with chains. A traffic signals may include information received by a wireless transceiver located in the vehicle 105 from a transmitting source, where the information provides information regarding whether snow chains are required.

Figure 2:
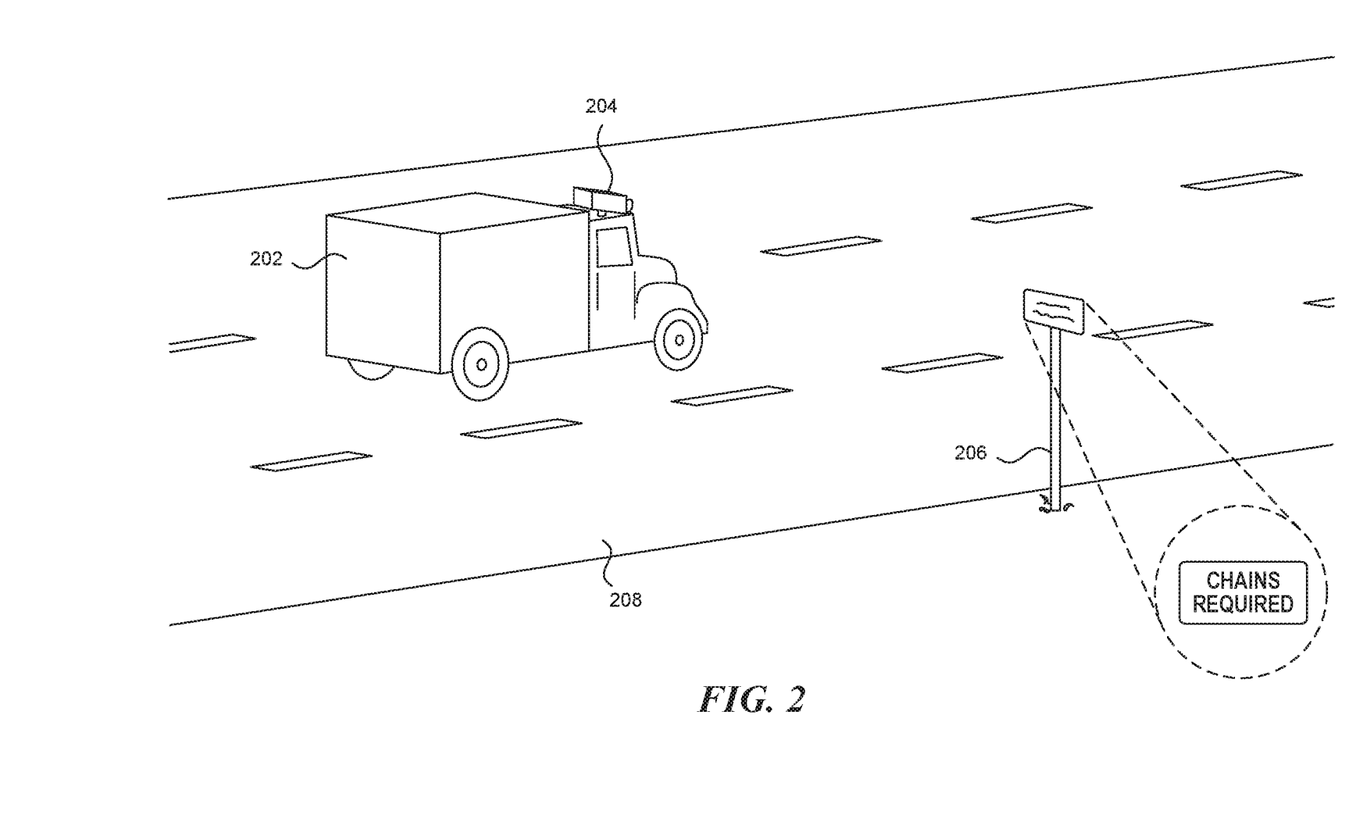
FIG. 2 shows an example scenario where an autonomous vehicle operating on a road can analyze a traffic sign to deploy snow chains.

FIG. 2 shows an example scenario where an autonomous vehicle operating on a road can analyze a traffic sign to deploy snow chains. An autonomous vehicle 202 includes a camera 204 that is located on top of the autonomous vehicle 202 and pointed in a forward direction towards which the autonomous vehicle 202 is driven. The camera 204 can obtain images of the area towards which the autonomous vehicle 202 is driven. As shown in FIG. 2, the camera 204 can obtain images of the side of the road 208 that includes a physical traffic sign 206. The traffic sign 206 may include the words "chains required" or may snow a picture of a tire with chains.

The camera 204 can send the images to the snow chain determination module in the in-vehicle control computer. The snow chain determination module performs image processing to determine whether the images contain a traffic sign. If the snow chain determination module determines that the images contain a traffic sign, then the snow chain determination module can determine whether a region or a portion of the image comprising the traffic sign contains words or pictures to indicate whether snow chains are required for operating the autonomous vehicle 202 on the road 208. In an example implementation, the snow chain determination module can perform optical character recognition on a portion of the image comprising the traffic sign to determine whether the text in the traffic sign indicates that snow chains are required. In another example implementation, the snow chain determination module can perform image processing to determine whether the traffic sign 206 includes a picture that indicates that snow chains are required. The snow chain determination module can, upon determining that the traffic sign 206 indicates that snow chains are required, send instructions to the snow chain devices located on the autonomous vehicle 202 to deploy the snow chains.

In some other embodiments, the snow chain determination module can receive information transmitted wirelessly and received by the wireless transceiver located in the autonomous vehicle 202. The information can indicate whether snow chains are required. For example, a snow chain determination module can receive information received by the wireless transceiver, where the information includes a message that states that "snow chains are required." Upon receiving the message, the snow chain determination module can send instructions to the snow chain devices located on the autonomous vehicle 202 to deploy the snow chains. For example, a server in a command center may wirelessly send instructions to the autonomous vehicle 202, where the instructions received by the snow chain determination module via the wireless transceiver can instruct the snow chain determination module to send instructions to the snow chain device to deploy the snow chains.

IV. Snow Chain Deployment Based on Weather Conditions and/or Road Conditions

In FIG. 1, the sensors and/or wireless transceiver onboard the vehicle 105 can be used to obtain information about the environment in which the vehicle 105 is operating so that the snow chain determination module 165 can determine whether to deploy the snow chain devices based on the weather conditions and/or road conditions. As shown in FIG. 1, the vehicle 105 may be equipped with several sensors that can perform a variety of measurements to enable autonomous driving related operations. For example, the vehicle sensor subsystem 144 may include cameras located on the vehicle 105, a temperature sensor, a wireless transceiver (e.g., cellular transceiver), Radar, LiDAR, etc. Since the vehicle 105 may include several sensors, in some embodiments, the snow chain determination module 165 can use sensor data from multiple sensors to more accurately determine whether a weather and/or road condition requires snow chain to be deployed. One of the benefits of the techniques described in this patent document is that sensor data from multiple onboard sensors can be used to determine whether to deploy the snow chains.

The in-vehicle control computer 150 includes a navigation module 172 that can determine a driving path or route for the vehicle 105 based on a starting position that may be provided by a GPS transceiver and a destination that may be provided via a display associated with the in-vehicle control computer 150. In some embodiments, the navigation module 172 can receive the driving path or route from a server located outside of the vehicle 105 (e.g., a server in a command center). The navigation module 172 may additionally be configured to update the driving path dynamically while the vehicle 105 is in operation. In some embodiments, the navigation module 172 may be configured to incorporate data from the GPS transceiver and one or more predetermined maps stored in the in-vehicle control computer 150 so as to determine the driving path for the vehicle 105.

The snow chain determination module 165 can determine weather conditions along the driving path by sending a request to a weather server via the wireless transceiver. The snow chain determination module 165 may obtain from the navigation module 172 the starting position of the vehicle 105 and the destination where the is to be driven vehicle 105. The snow chain determination module 165 can include the starting position and the destination in the request that is sent to the weather server. The snow chain determination module 165 can receive, from the weather server via the wireless transceiver, weather information along the driving path. The weather information may indicate whether one or more regions along the driving path has received snowfall or will experience snowfall when the vehicle 105 is driven to its destination. The one or more regions along the driving path may be associated with GPS locations or other identifiers that can enable the snow chain determination module 165 to determine when to deploy the snow chains and when to retract the snow chains. Thus, when the snow chain determination module 165 determines that the vehicle 105 arrives at the one or more regions, the snow chain determination module 165 sends instructions to the snow chain devices to deploy the snow chains, and when the snow chain determination module 165 determine that the vehicle 105 departs (or is outside of) the one or more regions, the snow chain determination module 165 sends instructions to the snow chain devices to retract the snow chains.

In some embodiments, the wireless transceiver may receive information about whether snow chains are required as the vehicle 105 is driven along a driving path. For example, a local transmitter operated by a weather service or government entity (e.g., a State's Department of Transportation) and located on a road may transmit information that can alert vehicles of when snow chains are required. The wireless transceiver may receive content from the local transmitter when the vehicle 105 is within a wireless range of the local transmitter. In an example scenario, a road may require snow chains when vehicles travel along a 10-mile segment of the road. In this example scenario, a local transmitter located on the road at the start of the 10-mile segment may transmit information indicating that snow chains are required. In this example scenario, the snow chain determination module 165 may receive the information from the local transmitter when the vehicle 105 arrives at the 10-mile segment and send instructions to the snow chain devices to deploy the snow chains.

In some embodiments, the snow chain determination module 165 can determine when to deploy the snow chains based on measurements provided by sensors onboard the vehicle 105. For example, snow chain determination module 165 may use measurements provided by a temperature sensor and images provided by a camera to determine whether frost or ice may be present on the road so that the snow chain determination module 165 can deploy the snow chain devices. A temperature sensor may be located on the vehicle 105 to measure the temperature of the environment in which the vehicle 105 is operating, or the temperature sensor may be located below the vehicle and can measure temperature of the road on which the vehicle 105 is driven. The snow chain determination module 165 may receive the measured temperature from the temperature sensor and can perform image processing on an image provided by the camera onboard the vehicle 105. When the snow chain determination module 165 determines that that the temperature is below a pre-determined value (e.g., 34 degrees Fahrenheit), and the snow chain determination module 165 determines a presence of a fog in the image, the snow chain determination module 165 can determine that ice may be present on the road and send instructions to the snow chain devices to deploy the snow chains.

Frost may occur on cold, clear nights when wind speeds is less than 10 mph. The snow chain determination module 165 can receive from the wireless transceiver wind speed information of an area in which the vehicle 105 is operating. The wind speed information may be provided by a weather service. The snow chain determination module 165 may also receive temperature information from the temperature sensor on the vehicle 105 and image from a camera on the vehicle 105. If the snow chain determination module 165 determines that the wind speed in an area where the vehicle 105 is operating is less than a pre-determined value (e.g., 10 mph) and that the temperature is below a pre-determined value (e.g., 34 degrees Fahrenheit), and the image from the camera indicates clear night sky, then the snow chain determination module 165 can send instructions to the snow chain devices to deploy the snow chains. In an example implementation, the snow chain determination module 165 determines that the image indicates a clear night sky upon determining a dark (or black) sky without clouds.

Information from other sensors located on the vehicle 105 may also assist the snow chain determination module 165 to determine whether to deploy the snow chain devices. In some embodiments, the snow chain determination module 165 may receive information from the wheel speed sensors located in the vehicle 105 to determine the vehicle's 105 speed with the rate at which the wheels are spinning. The snow chain determination module 165 can determine that there is slip occurring between the tire and the road when the snow chain determination module 165 determines that a difference between the vehicle's speed and the wheel's speed is greater than a pre-determined value (e.g., more than 2 mph or more than a 2% of vehicle's speed). Upon determining that the wheels are slipping, the snow chain determination module can send instructions to the snow chain devices to deploy the snow chains.

In some embodiments, the snow chain determination module 165 can determine whether a snow chain device that has been deployed is functioning properly by analyzing data received from the sensors in the vehicle 105. Such a technique can be advantageous so that the autonomous vehicle or a driver in the autonomous vehicle does not operate on a false notion that snow chain devices are operating properly when in fact they may not. Thus, in some embodiments, the snow chain determination module 165 can receive information from a vibration sensor located in the vehicle 105 (e.g., on the axle) so that the snow chain determination module 165 can obtain information about the extent of the vibration experienced by the tires. If, after the snow chain devices have been deployed, the snow chain determination module determines that the amount of vibration is greater than an average amount of vibration previously measured without snow chains devices deployed, then the snow chain determination module 165 can determine that the snow chains are operating properly. This is an advantageous feature so that the driver can be informed of any problems with the snow chains since the automated snow chain devices described in this patent document can operate without having a driver manually install the snow chains.

In some embodiments, after the snow chain devices have been deployed, the snow chain determination module can determine that the amount of vibration is less than an average amount of vibration previously measured without snow chains devices deployed, then the snow chain determination module 165 can send a malfunction message to be displayed on a display of the in-vehicle control computer to indicate to a driver that a snow chain may have malfunctioned. In some embodiments, multiple vibration sensors may be employed close to multiple tires so that vibration from individual tires can be measured and any malfunction message can identify the snow chain for a particular tire that may have malfunctioned.

Figure 3:
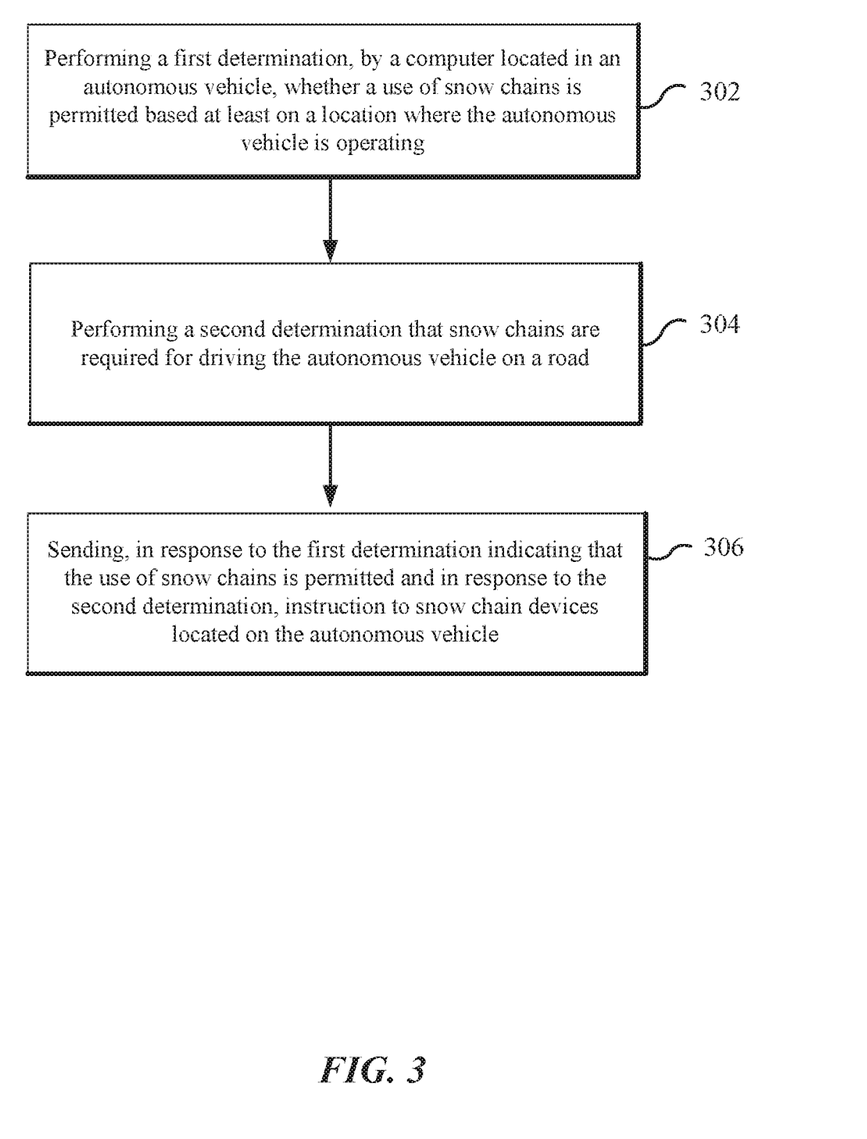
FIG. 3 shows a flow diagram for determining snow chain deployment.

FIG. 3 shows a flow diagram for determining snow chain deployment. Operation 302 includes performing a first determination, by a computer located in an autonomous vehicle, whether a use of snow chains is permitted based at least on a location where the autonomous vehicle is operating. Operation 304 includes performing a second determination that the snow chains are required for driving the autonomous vehicle on a road. Operation 306 includes sending, in response to the first determination indicating that the use of snow chains is permitted and in response to the second determination, instruction to snow chain devices located on the autonomous vehicle, where the instruction triggers the snow chain devices to deploy the snow chains on tires of the autonomous vehicle.

The following features may be present in the methods, systems, and apparatus for automatic snow chain deployment in any reasonable combination. In some embodiments, the first determination is performed by selecting a snow chain rule associated with an area that includes the location where the autonomous vehicle is operating, and the snow chain rule is selected from a pre-determined list of snow chain rules that indicate whether or when snow chains are permitted in a plurality of areas. The snow chain rule may indicate a range of dates when the use of the snow chains is permitted, and the first determination may include determining that the use of the snow chain is permitted based the determination that a date when the autonomous vehicle is operating is within the range of dates when the use of snow chains is permitted. Alternatively, or additionally, the snow chain rule may indicate a range of dates when snow chain use is not permitted. When such a snow chain rule is employed, a first determination may include determining that the snow chain use is not permitted based on an overlap between a date when the autonomous vehicle is operating and the range of dates when the use of snow chains is not permitted. Deployment of the snow chain devices may be disabled in response to the determining that snow chain use is not permitted. Deployment of snow chains by the snow chain devices may be prevented or disabled when the autonomous vehicle is operating during a period that is outside of the date range when snow chain use is permitted.

Performing the second determination may be based on a traffic sign located on the road, where the traffic sign includes words that indicate that snow chains are required. In some embodiments, the method may also include receiving an image of an area towards which the autonomous vehicle is operating from a camera located on the autonomous vehicle. In such embodiments in which the image includes the traffic sign; and determining that the traffic sign in the image indicates that snow chains are required may by performed by optical character recognition on a portion of the image associated with the traffic sign.

Alternatively, or additionally, performing the second determination may be based on a traffic sign located on the road. In such a performance of the second determination, the traffic sign can include a picture that indicates that snow chains are required. Performing the second determination may be based on a message received from a remote computer in a command center located outside the autonomous vehicle, and where the message indicates that snow chains are required for driving the autonomous vehicle on the road.

Performing the second determination may be based on road conditions in some embodiments. The road conditions may be determined by receiving temperature measurement of an environment in which the autonomous vehicle is operating from a temperature sensor located on the autonomous vehicle. The road conditions may be also determined by receiving an image of an area towards which the autonomous vehicle is driven from a camera located on the autonomous vehicle. In such methods, the second determination that the snow chains are required (i.e., that there is an active snow chain requirement) may be performed in response to at least two further determinations. The two further determinations can include a third determination that the temperature is less than a pre-determined value and a fourth determination indicating the presence of fog in the image capture of the area toward which the autonomous vehicle is driven. The temperature of the environment may be the temperature of the road.

Performing the second determination can be based on road conditions determined by receiving information that indicates a wind speed of a region. The region can include the location where the autonomous vehicle is operating. The second determination can also include receiving a measurement of a temperature of an environment in which the autonomous vehicle is operating from a temperature sensor located on the autonomous vehicle. Alternatively, or additionally, the second determination can include receiving an image of an area towards which the autonomous vehicle is driven from a camera located on the autonomous vehicle. In some cases the second determination that the snow chains are required may be performed in response to other determinations. The other determinations can include a third determination that the wind speed is less than a first pre-determined value, a fourth determination that the temperature is less than a second pre-determined value, and a fifth determination that the image includes a clear night sky.

Performing the second determination can be based on weather conditions determined by determining a driving path along which the autonomous vehicle is operating to reach a destination. The method can also include receiving the weather conditions along the driving path, as well as determining that one or more regions along the driving path require snow chains based on the weather conditions. In some cases, instructions are sent to snow chain devices when the autonomous vehicle is determined to arrive at the one or more regions along the driving path.

The method may also include sending a second instruction to the snow chain devices that causes the snow chain devices to retract the snow chains upon determining that the autonomous vehicle is outside of the one or more regions. In some embodiments, performing the second determination may be based on reception of information by the computer. The computer may receive information from a transmitter located on the road. The information may indicate that snow chains are required. Sending the instruction to snow chain devices may be performed in response to receipt of the information. Additionally, or alternatively, performing the second determination may be based on: receiving a wheel speed of a wheel of the autonomous vehicle from a wheel speed sensor located in the autonomous vehicle. Sending the instruction to snow chain devices may be performed in response to determining that a difference between the autonomous vehicle's speed and the wheel speed (i.e. rotational speed) of the vehicle's wheel is greater than a pre-determined value.

The pre-determined value may be a percentage of the speed of the autonomous vehicle, in some embodiments. Additionally, or alternatively, the snow chain devices may be deployed by causing the snow chain devices to move down towards the tires of the autonomous vehicle. In such embodiments, the snow chains may spin, or may be spun, between the tires of the autonomous vehicle and the road. In some embodiments, the location of the autonomous vehicle may be provided by a global positioning system (GPS) device located on the autonomous vehicle.

In this document the term "exemplary" is used to mean "an example of" and, unless otherwise stated, does not imply an ideal or a preferred embodiment. In the patent document the term "semi-trailer truck" is used to describe features of the snow chain deployment techniques. However, the snow chain deployment techniques described can be applied to other kinds of vehicles.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of autonomous driving operation, comprising:
    performing a first determination, by a computer located in an autonomous vehicle, whether a use of snow chains is permitted based at least on a location where the autonomous vehicle is operating,
        wherein the first determination is performed by selecting a snow chain rule associated with an area that includes the location where the autonomous vehicle is operating,
        wherein the snow chain rule is selected from a predetermined list of snow chain rules that indicate whether or when snow chains are permitted in a plurality of areas,
        wherein the snow chain rule indicates a range of dates when the use of snow chains is permitted, and
        wherein the first determination includes determining that the use of the snow chain is permitted based on determining that a date when the autonomous vehicle is operating is within the range of dates when the use of snow chains is permitted;
    performing a second determination that snow chains are required for driving the autonomous vehicle on a road; and
    sending, in response to the first determination indicating that the use of snow chains is permitted and in response to the second determination, instruction to snow chain devices located on the autonomous vehicle, wherein the instruction triggers the snow chain devices to deploy snow chains on tires of the autonomous vehicle.

2. The method of claim 1,
    wherein the snow chain rule indicates a range of dates when the use of snow chains is not permitted,
    wherein the first determination includes determining that the use of snow chains is not permitted based on determining that a date when the autonomous vehicle is operating is within the range of dates when the use of snow chains is not permitted; and
    wherein a deployment of the snow chain devices is disabled in response to the determining that the use of snow chains is not permitted.

3. The method of claim 1, wherein the performing the second determination is based on a traffic sign located on the road, wherein the traffic sign includes words that indicate that snow chains are required.

4. The method of claim 3, further comprising:
    receiving, from a camera located on the autonomous vehicle, an image of an area towards which the autonomous vehicle is operating, wherein the image comprises the traffic sign; and
    determining that the traffic sign in the image indicates that snow chains are required by performing optical character recognition on a portion of the image associated with the traffic sign.

5. A system for autonomous vehicle operation, the system comprising a computer that includes a processor configured to implement a method comprising:
    perform a first determination, by a computer located in an autonomous vehicle, whether a use of snow chains is permitted based at least on a location where the autonomous vehicle is operating,
        wherein the first determination is performed by a selection of a snow chain rule associated with an area that includes the location where the autonomous vehicle is operating,
        wherein the snow chain rule is selected from a predetermined list of snow chain rules that indicate whether or when snow chains are permitted in a plurality of areas,
        wherein the snow chain rule indicates a range of dates when the use of snow chains is permitted, and
        wherein the first determination includes determining that the use of the snow chain is permitted based on determining that a date when the autonomous vehicle is operating is within the range of dates when the use of snow chains is permitted;
    perform a second determination that snow chains are required for driving the autonomous vehicle on a road; and
    send, in response to the first determination indicating that the use of snow chains is permitted and in response to the second determination, instruction to snow chain devices located on the autonomous vehicle, wherein the instruction triggers the snow chain devices to deploy snow chains on tires of the autonomous vehicle.

6. The system of claim 5, wherein the perform the second determination is based on a traffic sign located on the road, and wherein the traffic sign includes a picture that indicates that snow chains are required.

7. The system of claim 5, wherein the perform the second determination is based on a message received from a remote computer in a command center located outside the autonomous vehicle, and wherein the message indicate that snow chains are required for driving the autonomous vehicle on the road.

8. The system of claim 5, wherein the perform the second determination is based on road conditions determined by the processor configured to:
receive, from a temperature sensor located on the autonomous vehicle, a measurement of a temperature of an environment in which the autonomous vehicle is operating;
receive, from a camera located on the autonomous vehicle, an image of an area towards which the autonomous vehicle is driven; and
wherein the second determination that snow chains are required is performed in response to:
a third determination that the temperature is less than a pre-determined value, and
a fourth determination that a presence of fog in the image.

9. The system of claim 8, wherein the temperature of the environment is the temperature of the road.

10. The system of claim 5, wherein the perform the second determination is based on road conditions determined by the processor configured to:
receive information that indicates a wind speed of a region that includes the location where the autonomous vehicle is operating;
receive, from a temperature sensor located on the autonomous vehicle, a measurement of a temperature of an environment in which the autonomous vehicle is operating;
receive, from a camera located on the autonomous vehicle, an image of an area towards which the autonomous vehicle is driven; and
wherein the second determination that snow chains are required is performed in response to:
a third determination that the wind speed is less than a first pre-determined value,
a fourth determination that the temperature is less than a second pre-determined value, and
a fifth determination that the image comprises a clear night sky upon a determination that the image includes a black sky without clouds.

11. A non-transitory computer readable program storage medium having code stored thereon, the code, when executed by a processor, causing the processor to implement a method comprising:
performing a first determination, by a computer located in an autonomous vehicle, whether a use of snow chains is permitted based at least on a location where the autonomous vehicle is operating,
wherein the first determination is performed by selecting a snow chain rule associated with an area that includes the location where the autonomous vehicle is operating,
wherein the snow chain rule is selected from a pre-determined list of snow chain rules that indicate whether or when snow chains are permitted in a plurality of areas,
wherein the snow chain rule indicates a range of dates when the use of snow chains is permitted, and
wherein the first determination includes determining that the use of the snow chain is permitted based on determining that a date when the autonomous vehicle is operating is within the range of dates when the use of snow chains is permitted;
performing a second determination that snow chains are required for driving the autonomous vehicle on a road; and
sending, in response to the first determination indicating that the use of snow chains is permitted and in response to the second determination, instruction to snow chain devices located on the autonomous vehicle, wherein the instruction triggers the snow chain devices to deploy snow chains on tires of the autonomous vehicle.

12. The non-transitory computer readable program storage medium of claim 11, wherein the performing the second determination is based on weather conditions determined by:
determining a driving path along which the autonomous vehicle is operating to reach a destination;
receiving the weather conditions along the driving path;
determining, based on the weather conditions, that one or more regions along the driving path require snow chains; and
wherein the sending the instruction to snow chain devices is performed when the autonomous vehicle is determined to arrive at the one or more regions.

13. The non-transitory computer readable program storage medium of claim 12, further comprising:
sending a second instruction to the snow chain devices that causes the snow chain devices to retract snow chains upon determining that the autonomous vehicle is outside of the one or more regions.

14. The non-transitory computer readable program storage medium of claim 11, wherein the performing the second determination is based on a reception of information by the computer by:
receiving, from a transmitter located on the road, information that indicates that snow chains are required; and
wherein the sending the instruction to snow chain devices is performed in response to the receiving the information.

15. The non-transitory computer readable program storage medium of claim 11, wherein the performing the second determination is based on:
receiving, from a wheel speed sensor located in the autonomous vehicle, a wheel speed of a wheel of the autonomous vehicle;
wherein the sending the instruction to snow chain devices is performed in response to determining that a difference between a speed of the autonomous vehicle and the wheel speed of the wheel is greater than a pre-determined value.

16. The non-transitory computer readable program storage medium of claim 15, wherein the pre-determined value is a percentage of the speed of the autonomous vehicle.

17. The non-transitory computer readable program storage medium of claim 11, wherein the snow chain devices are deployed by:
causing the snow chain devices to move down towards the tires of the autonomous vehicle, wherein snow chains are caused to spin between the tires of the autonomous vehicle and the road.

18. The non-transitory computer readable program storage medium of claim 11, wherein the location of the autonomous vehicle is provided by a global positioning system (GPS) device located on the autonomous vehicle.

* * * * *